United States Patent
Caramanis (10) Patent No.: US 6,409,271 B1
(45) Date of Patent: Jun. 25, 2002

(54) COMBINED SEAT BELT COVER AND PILLOW

(76) Inventor: Lisa Caramanis, 143 Partridge Dr., Middleton, NH (US) 03887

( * ) Notice: Subject to any disclaimer, the term of this patent is extended or adjusted under 35 U.S.C. 154(b) by 0 days.

(21) Appl. No.: 09/615,186

(22) Filed: Jul. 13, 2000

(51) Int. Cl.⁷ .............................................. B60R 22/00
(52) U.S. Cl. ....................... 297/482; 297/397; 297/181; 280/801.1
(58) Field of Search ............................. 297/482, 217.3, 297/397, 181; 280/801.1, 808

(56) References Cited

U.S. PATENT DOCUMENTS

| | | |
|---|---|---|
| 4,595,618 A | 6/1986 | Caringer |
| 4,619,468 A | 10/1986 | Spill |
| 4,699,401 A | 10/1987 | Saenz |
| 4,886,318 A * | 12/1989 | Pennock .................. 297/482 X |
| D323,363 S | 1/1992 | Ely |
| 5,114,185 A | 5/1992 | Reedom |
| 5,265,932 A | 11/1993 | Leonard |
| 6,017,094 A | 1/2000 | Syiek |

* cited by examiner

Primary Examiner—Anthony D. Barfield
(74) Attorney, Agent, or Firm—O'Connell Law Firm

(57) ABSTRACT

A combined seat belt cover and pillow for use relative to a vehicular seat belt arrangement comprising an elongate seat belt cover for coupling to an elongate seat belt and a pillow coupled to the elongate seat belt cover adjacent to a first end of the elongate seat belt cover. The elongate seat belt cover and pillow can cooperate to simulate a head and a body of an animal wherein the pillow simulates the head of the animal and the elongate seat belt cover simulates at least a portion of the body of the animal. First and possibly second generally rigid widened portions of the elongate seat belt cover can simulate sets of legs of the simulated animal to disperse the force of the elongate seat belt relative to the vehicular occupant. A miniature simulation of the simulated animal can be retained by the elongate seat belt cover in a pocket, and a strip of ultra-smooth material can be affixed to the elongate seat belt cover and pillow. Still further, a speaker and a means for causing the speaker to provide audible communications to a vehicular occupant can be incorporated for providing, for example, automatic reminders to a vehicular occupant to fasten his or her seat belt. Even further still, the elongate seat belt cover and pillow can cooperate to simulate a game projectile and a striking implement.

20 Claims, 4 Drawing Sheets

COMBINED SEAT BELT COVER AND PILLOW

FIELD OF THE INVENTION

The present invention relates generally to restraint devices. Stated more particularly, the present patent discloses and protects a combined seat belt cover and pillow arrangement for improving the safety, comfort, and enjoyment of automobile occupants, particularly child passengers.

BACKGROUND OF THE INVENTION

Even the casual observer will be aware that restraint systems for use in automobiles have undergone an effectively continuous evolution with the ever present goals of improving the safety and comfort of vehicular occupants. Early automobiles with no restraint systems eventually gave way to automobiles with simple lap belts designed for keeping the occupant generally in place in his or her seat during a vehicular collision or other rapid change in velocity or orientation.

Eventually, designers of automobile safety systems realized that merely fixing an occupant in place was insufficient; it became clear that restraining the occupants upper torso against lateral and forward movement was also necessary. With this, a number of designers and inventors designed systems for restraining occupants' upper torsos in addition to their midsections. These systems typically have fallen into two categories. The first is the provision of a supplementary diagonal shoulder belt that is functionally separate from the vehicle's lap belt. The second type of system provides upper torso restraint by means of a three-point safety belt system wherein a shoulder belt and a lap belt are mutually coupled to a first buckle element that can be drawn across an occupant's body and engaged with a second buckle element.

More recently, air bag cushioning and restraint systems have been disclosed with the intent of supplementing belt-type restraint systems. Under a typical air bag system, a bag element is retained in a folded configuration in a vehicle's steering wheel for the driver and in the vehicle's dashboard for the front seat passenger. Still more recent developments have yielded inflatable elements disposed lateral to an occupant's head. In each of these air bag systems, a vehicular collision will trigger an inflation mechanism that will nearly instantaneously inflate the bag element thereby interposing the inflated bag element between the occupant and hard surfaces of the occupant's vehicle and external objects such as other vehicles and environmental structures.

The above-summarized developments in the field of occupant restraint systems unquestionably have usefully cooperated to establish the present state of the art. Vehicular occupants have gone from having no protection in the event of a collision other than the actual body of the vehicle to having the possibility of multi-point restraints in combination with air-filled cushions. With this, present-day passengers undoubtedly enjoy markedly safer travel options than those of years past.

Nonetheless, one knowledgeable in the art will be aware that, as with most fields of endeavor, there remain a number of needs left unmet in the art of occupant restraint systems. A number of these needs become particularly apparent when standard occupant restraint systems, which are nearly without exception designed for use by adult-sized and aged occupants, are attempted to be used relative to younger vehicular occupants.

One problem with employing standard belt-type occupant restraint systems relative to children is that the tightly woven, narrow shoulder belt often tends toward passing over the child's head or neck. With this, the shoulder belt oftentimes is slipped behind the child, placed under the child's arm, or simply allowed to rest against the child's neck and chin. Of course, each practice is less than ideal. Placing the shoulder belt behind the child obviates its effectiveness while placing the belt under his or her shoulder not only reduces the belt's effectiveness but also places the belt in a dangerous position where it can be driven into the child's abdomen or ribs during an impact or the like. At least as disadvantageous is the practice of leaving the narrow belt pressing against the child's throat, which can lead to choking, chafing, and discomfort even absent a collision.

Even in light of the aforedescribed adversities, it is beyond question that a child's wearing of his or her seat belt in any manner is preferable to wearing no seat belt at all. While children wearing seat belts under the less than advantageous circumstances summarized above can lead to discomfort and certain injuries, wearing no seat belt at all is typically even more dangerous since it subjects the child to being ejected from the vehicle and to being violently thrown about within and against the interior of the vehicle.

All too often, however, children forego wearing their seat belts. Often it may be due to the discomfort and awkwardness discussed above that results in part from the belt's being designed primarily for use by adults and in part from aspects of the typical belt's design that make it uncomfortable or disadvantageous for all vehicular occupants. Just as often, a child's failure to wear his or her seat belt is the result of inadvertence. In other words, children often simply forget to fasten their seat belts.

In light of the foregoing, it becomes apparent that children would be well served by a device that would help to make their wearing of seat belts safer and more comfortable. Just as clearly, one will appreciate that there is a need for a device for motivating children to fasten their seat belts. On a similar note, it is clear that a device providing an active reminder to children to fasten their seat belts would also enhance child safety.

SUMMARY OF THE INVENTION

Advantageously, the present invention is founded on the basic object of providing an arrangement for use relative to seat belts that provides a solution to each of the needs set forth above while providing a number of still further benefits and advantages.

A more particular object of the invention is to provide an arrangement that covers the narrow standard seat belt strap to provide a broader and softer surface pressing against a vehicular occupant.

An incidental object of the invention is to provide an arrangement that improves the comfort and safety of vehicular occupants, particularly children.

A further object of the invention is to provide a combined seat belt cover and pillow that motivates vehicular occupants, particularly children, to fasten their safety belts.

Still another object of the invention is to provide a combined seat belt cover and pillow that actively reminds vehicular occupants, children in particular, to affix their safety belts.

A still further object of the invention is to provide a combined seat belt cover and pillow that can be easily and conveniently removed and replaced relative to a vehicular seat belt.

An even further object of the invention is to provide a combined seat belt cover and pillow that can be adjusted in position relative to a vehicular seat belt thereby to accommodate vehicular occupants of a variety of sizes.

Of course, these and further objects and advantages of the invention would be readily obvious not only to one skilled in the art who reviews the present disclosure and the accompanying drawing figures but also to one who has an opportunity to take advantage of an embodiment of the present invention.

In accomplishing the aforementioned objects, a most basic embodiment of the present invention for a combined seat belt cover and pillow is founded on an elongate seat belt cover with a first end that is coupled to a pillow and a second end. In preferred embodiments, the combined seat belt cover and pillow can comprise a simulation of any one of a number of different animals or structures. Where the combined seat belt cover and pillow simulates an animal, the pillow can simulate a head and the elongate seat belt cover can simulate a body of the animal. A tail can be fixed to and extend from the second end of the elongate seat belt cover. Also, a set of simulative front legs can be coupled to the elongate seat belt cover adjacent to the first end thereof while a set of simulative rear legs can be coupled to the elongate seat belt cover adjacent to the second end thereof.

The pillow can have a pair of simulative ears coupled to opposite sides thereof, a pair of simulative eyes coupled to a central portion thereof, a simulative nose coupled near a distal end thereof, and a simulative tongue coupled to the distal end thereof.

The simulative front legs can form a first widened portion of the elongate seat belt cover while the simulative rear legs can form a second widened portion of the elongate seat belt cover. Ideally, the first and second widened portions can be somehow reinforced or rigidified with a resiliently deformable material to disperse further the force of the shoulder belt against the chest and abdomen of the vehicular occupant, which can be particularly advantageous in a collision or rapid braking situation where shoulder belts not encased in the combined seat belt cover and pillow often tend to be driven into and to injure vehicular occupants, particularly children.

Even further, a speaker can be incorporated into the pillow or the elongate seat belt cover. By means well known in the art, the speaker can be crafted to provide audible communications to the vehicular occupants. For example, the speaker could be designed to play songs, stories, or other entertaining communications. These communications could be triggered automatically upon a movement of the pillow or they could be triggered by a vehicular occupant's triggering of a switch. Even more advantageously, the speaker could be designed to provide a reminder to the vehicular occupants to fasten their seat belt arrangements. Still further, a small item imitating the simulated structure of the combined seat belt cover and pillow can be tucked into a pocket that is included on the elongate seat belt cover.

With certain embodiments of the present invention for a combined seat belt cover and pillow generally described, one will appreciate that the foregoing discussion broadly outlines the more important features of the invention merely to enable a better understanding of the detailed description that follows and to instill a better appreciation of the inventor's contribution to the art. Before any particular embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

As is the case with many inventions, the present invention for a combined seat belt cover and pillow is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
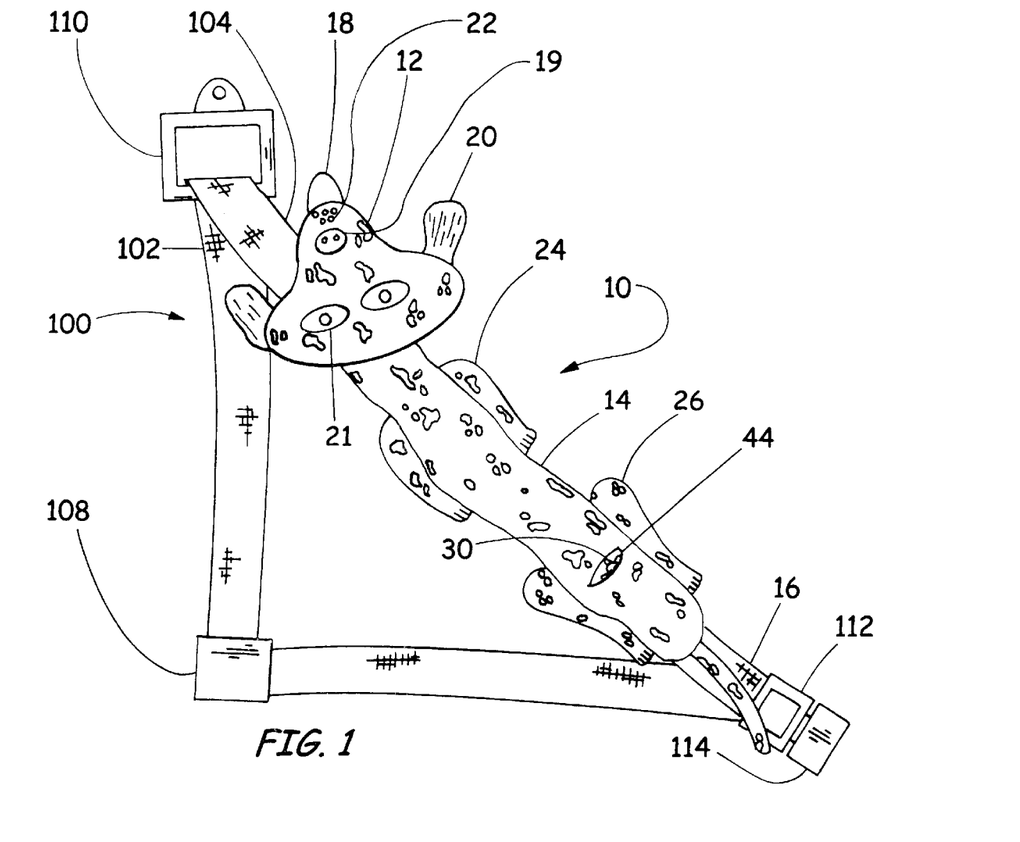
FIG. 1 is a view in front elevation of a combined seat belt cover and pillow according to the present invention shown coupled to a typical vehicular seat belt.

With this in mind and looking more particularly to the drawings, a preferred embodiment of the present invention for a combined seat belt cover and pillow is indicated generally at 10 in FIG. 1 where it is shown employed relative to a typical vehicular seat belt arrangement 100. In FIG. 1, one sees that the seat belt arrangement 100, which is typical of the prior art in a wide variety of vehicle types, can be said to be founded on a seat belt spool housing 108. A lap belt 106 has a distal end fixed to a first buckle element 112 and a proximal end extending from the spool housing 108.

A diagonally communicating shoulder belt 104 has a distal end fixed to the first buckle element 112 and what may be considered a proximal end looping over an apertured loop element 110. In this case, the proximal end of the shoulder belt 104 is really not an end at all but merely integrally couples to a vertical belt 102 that has a proximal end extending from the spool housing 108. As is well known in the art, the proximal ends of the vertical belt 102 and the lap belt 106 are extendable and retractable relative to the spool housing 108 by spring-loaded spools, which are not shown, that are retained in the spool housing 108.

With this, a vehicular occupant seeking to fasten the seat belt arrangement 100 can being by grasping the first buckle element 112. The user can then draw the lap belt 106 and the shoulder belt 104 toward a second buckle element 114 until the first buckle element 112 can be matingly engaged. With the first and second buckle elements 112 and 114 matingly engaged, the lap belt 106 and the shoulder belt 104 will be fastened in place to restrain respectively the mid section and upper torso of the vehicular occupant.

Of course, the seat belt arrangement 100 of FIG. 1 is merely representative of the many three-point restraint systems disclosed by the prior art. As one skilled in the art will be well aware, a wide variety of seat belt arrangements have been disclosed for providing three points of restraint to vehicular occupants. For example, although they are not shown in the drawings, the knowledgeable reader will appreciate that certain seat belt arrangements have entirely independent shoulder and lap belts while others have a single expandable loop of belt material with a first buckle element slidably coupled thereto to divide the single loop of belt material into lap and shoulder belts when the first buckle element is coupled to a second buckle element.

With such a plurality of different seat belt arrangements known in the art, it must be noted that the seat belt arrangement 100 in FIG. 1 is depicted as background only. The type of seat belt arrangement is of little consequence other than as a foundation upon which embodiments of the present invention for a combined seat belt cover and pillow 10 can be attached. It should be noted further that, although the combined seat belt cover and pillow 10 is shown in the drawings as being coupled to the shoulder belt 104 of a three-point seat belt arrangement 100 and although the invention is primarily intended for being so coupled, it is just as possible that the combined seat belt cover and pillow 10 could be coupled to the lap belt 106 of a three-point or a two-point seat belt arrangement 100.

In any event, looking more particularly to the present invention for a combined seat belt cover and pillow 10, one sees again that it is coupled to the shoulder belt 104 of the seat belt arrangement 100 such that it would tend to communicate diagonally across the chest of a vehicular occupant, who is not shown in FIG. 1. As its name would suggest, the combined seat belt cover and pillow 10 is founded on an elongate seat belt cover 14 with a first end that is coupled to a pillow 12 and a second end. In this embodiment, the elongate seat belt cover 14 simulates a body portion of a dog while the pillow 12 simulates the dog's head.

In this case the dog is a Dalmatian. However, it will be clear that the combined seat belt cover and pillow 10 could simulate a wide variety of things and animals. For example, it could simulate other animals such as a cat, a mouse, a cow, or even a person or any one of an endless variety of animals. Of course, the combined seat belt cover and pillow 10 could simulate things other than animals including inanimate things, plants, or substantially any other structure that is amenable to being simulated by a pillow 12 and an elongate seat belt cover 14. As will be discussed below, when simulating an inanimate thing, one possible scheme for the combined seat belt cover and pillow 10 is the simulation of a sports ball by the pillow 12 and, possibly, a striking implement by the elongate seat belt cover 14.

As will be discussed more fully hereinbelow, the elongate seat belt cover 14 surrounds the shoulder belt 104 while the pillow 12 merely rests against the shoulder belt 104. The elongate seat belt cover 14 and the pillow 12 could be formed from a wide variety of materials. For example, the elongate seat belt cover 14 could have an outer surface of nylon, cotton, faux fur, or any of a wide variety of materials. Preferably, the material of the outer surface of the elongate seat belt cover 14 will be durable yet flexible and relatively soft. The same is true of outer surface of the pillow 12. However, the pillow 12 is of course stuffed with a soft stuffing material, which is not shown, to give it the volume and softness of a comfortable pillow. Preferably, the elongate seat belt cover 14 is also padded somewhat thereby softening and widening the otherwise harsh effects of a typical tightly woven shoulder belt 104.

In furtherance of its simulation of a dog or other legged animal, the combined seat belt cover and pillow 10 has a tail 16 that is fixed to and extends from the second end of the elongate seat belt cover 14. Also, a set of simulative front legs 24 is coupled to the elongate seat belt cover 14 adjacent to the first end thereof while a set of simulative rear legs 26 is coupled to the elongate seat belt cover 14 adjacent to the second end thereof. Making the simulation of the dog even more realistic, the pillow 12 has a pair of simulative ears 20 coupled to opposite sides thereof, a pair of simulative eyes 21 coupled to a central portion thereof, a simulative nose 19 coupled near a distal end thereof, and a simulative tongue 18 coupled to the distal end thereof.

Even under this most basic arrangement, the combined seat belt cover and pillow 10 achieves a number of its objects. For example, by surrounding the shoulder belt 104, the elongate seat belt cover 14 disperses the force of the shoulder belt 104 on the occupant over a greater area. With this, the seat belt cover 14 will tend to the make the vehicular occupant more comfortable during normal driving conditions. Also, the seat belt cover 14, especially when padded, will prevent the shoulder belt 104 from digging in to an occupant's chest and abdomen in the event of an impact or harsh braking situation. Furthermore, the pillow 12 of the combined seat belt cover and pillow 10 will provide a place for a vehicular occupant to rest his or her head when tired and will provide support for the occupant's head even during normal occupancy conditions. Still further, the pillow 10 can act to cushion the vehicle occupant's head in the event of an impact or other rapid change in velocity. Just as importantly, the simulative nature of the combined seat belt cover and pillow 10 will tend to motivate vehicular occupants, particularly children, to fasten their seat belt arrangements 100 thereby accomplishing what is among the most basic goals of the combined seat belt cover and pillow 10.

Nonetheless, a number of further aspects of the invention, which ideally are incorporated in many cases into the previously-described simulative structures of the combined seat belt cover and pillow 10, allow it to accomplish even more effectively the goals alluded to above while also accomplishing a number of still further advantages. For example, one will note that the simulative front legs 24 form a first widened portion of the elongate seat belt cover 14 while the simulative rear legs form a second widened portion of the elongate seat belt cover 14. Ideally, the first and second widened portions, which can also be considered to be indicated at 24 and 26, are somehow reinforced or rigidified with a resiliently deformable material. For example, the first and second widened portions 24 and 26 could be formed from panels of semi-rigid cellular foam or any number of other generally rigid yet resiliently deformable materials. As a result, the first and second widened portions 24 and 26 will even further disperse the force of the shoulder belt 104 against the chest and abdomen of the vehicular occupant, which can be particularly advantageous in a collision or rapid braking situation where shoulder belts 104 not encased in the combined seat belt cover and pillow 10 often tend to be driven into and to injury vehicular occupants, particularly children.

An even further aspect of the invention that is incorporated into the simulative structure of FIG. 1 is an area of ultra-smooth material, which in this case is incorporated into the simulative tongue 18 but could be applied elsewhere as well. A number of ultrasmooth materials could be employed and are well within the scope of the invention. In this preferred embodiment, the ultra-smooth material can comprise an area of silk or the like. Advantageously, as the experienced child caregiver will attest, children often enjoy touching and rubbing things made from ultra-smooth material. With this, a child occupying a seat that is provided with an embodiment of the combined seat belt cover and pillow 10 will be further motivated to employ his or her seat belt arrangement 100 and will be provided with an entertaining and comfortable diversion during travel.

One can perceive still another aspect of the invention by reference to FIG. 1 where a speaker 22 is shown to be incorporated into the nose portion of the pillow or head 12. By means well known in the art, the speaker 22 is crafted to provide audible communications to the vehicular occupants. For example, the speaker 22 could be designed to play songs, stories, or other entertaining communications. These communications could be triggered automatically upon a movement of the pillow 12 or they could be triggered by a vehicular occupant's triggering of a switch, which could for example be incorporated into the simulative dog's nose 19. Even more advantageously, again by means well known in the art, the speaker 22 could be designed to provide a reminder to the vehicular occupants to fasten their seat belt arrangements 100 as soon as the vehicle is started, the door is closed, or the pillow 12 is first jostled. The reminder communication could continue for a set period, could turn off on the fastening of the seat belt arrangement 100, or could be turned off manually by a pressing of the switch, which again could comprise the nose 19, a traditional switch, or substantially any other effective means. With this, the invention's further object of providing an active reminder to the vehicular occupant would be achieved most effectively.

Figure 2:
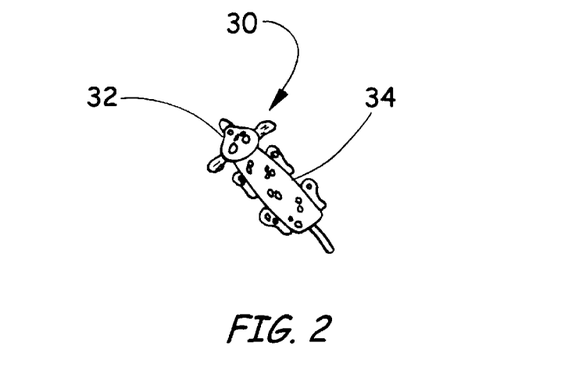
FIG. 2 is a view in front elevation of a miniature version of the combined seat belt cover and pillow for being retained by the combined seat belt cover and pillow.

Even further still, one may look in combination to FIGS. 1 and 2 to gain an understanding of yet another aspect of the invention. In FIG. 1, one can discern that a small item 30 is tucked into a pocket 44 that is included on the elongate seat belt cover 14. As FIG. 2 shows more clearly, the small item 30 in this preferred embodiment is a miniature imitation, which is also indicated at 30, of the larger simulation presented by the combined seat belt cover and pillow 10. Accordingly, since the combined seat belt cover and pillow 10 in this exemplary embodiment simulates a Dalmatian, the miniature imitation 30 of the larger simulation also simulates a Dalmatian. With this, the miniature imitation 30 has a simulative head portion 32 and a simulative body portion 34. Although not directly improving the safety and comfort provided by the combined seat belt cover and pillow 10, the miniature imitation 30 certainly provides a number of further advantages of the invention in that it will further motivate vehicular occupants to fasten their seat belt arrangements 100 and will provide a further entertaining diversion during travel.

Figure 3:
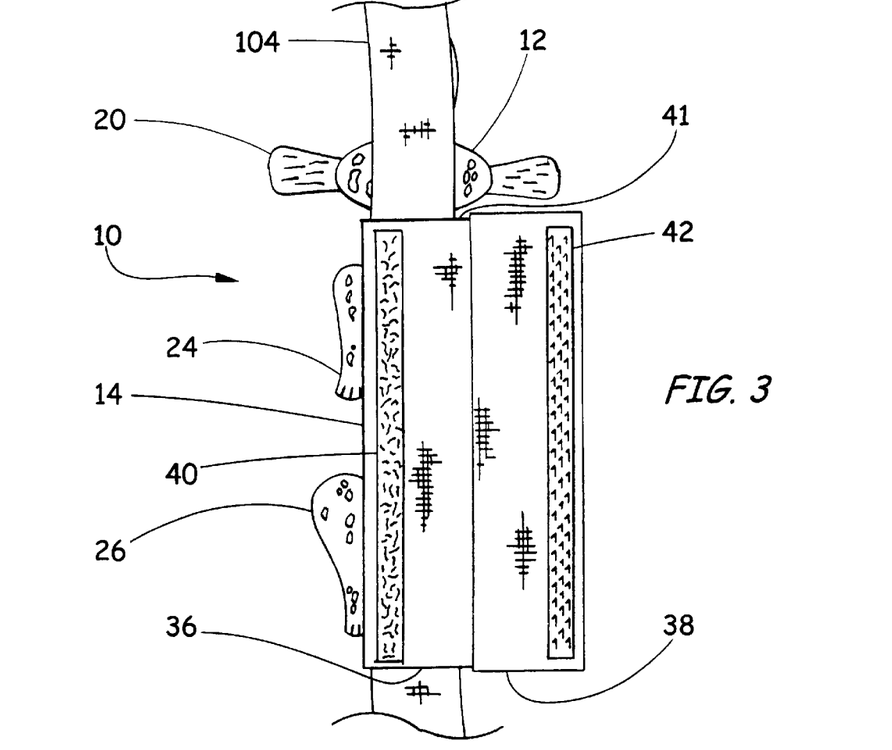
FIG. 3 is a view in rear elevation of the combined seat belt cover and pillow in a partially opened configuration.

A greater understanding of how the combined seat belt cover and pillow 10 is preferably coupled to the shoulder belt 104 can be gained by review of FIG. 3. There, one sees that the elongate seat belt cover 14 has a first panel 36 that has a strip of loop material 40 affixed thereto and that the elongate seat belt cover 14 has a second panel 38 that has a strip of hook material 42 affixed thereto. The strips of loop and hook material 42 and 40 are disposed on the first and second panels 36 and 38 to align with one another when the central panel 41 is applied to the shoulder belt 104, the first panel 36 is folded against the shoulder belt 104, and the second panel 38 is folded into contact with the first panel 36. With this, the combined seat belt cover and pillow 10 can be quickly and easily removed and replaced relative to the shoulder belt 104. Furthermore, the combined seat belt cover and pillow 10 is slidably associated with the shoulder belt 104 whereby the position of the combined seat belt cover and pillow 10 can be adjusted to accommodate vehicular occupants of a variety of sizes.

Figure 4:
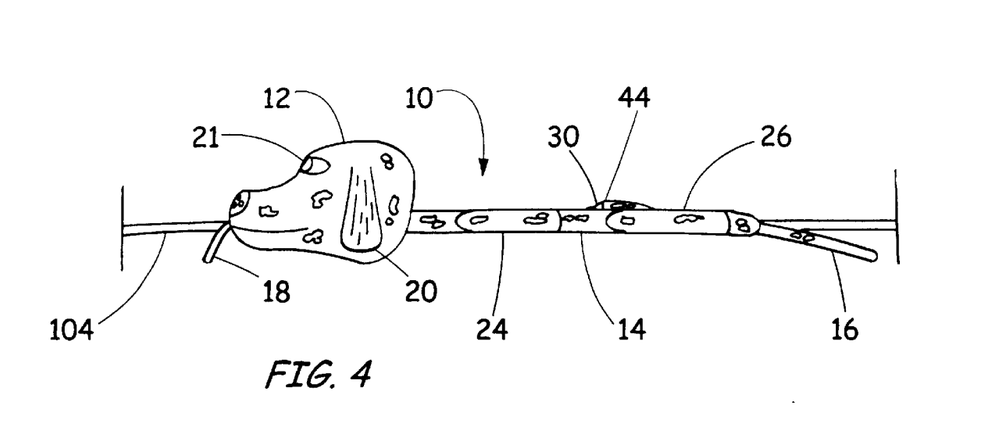
FIG. 4 is a view in side elevation of the combined seat belt cover and pillow of FIG. 1.

One may have reference to FIG. 4 for a still greater understanding of the configuration of the combined seat belt cover and pillow 10. There, it is shown that the elongate seat belt cover 14 and the simulative front and rear legs 24 and 26 are essentially thin and panel-like. On the other hand, FIG. 4 further shows that the head or pillow 12 is quite thick relative to the elongate seat belt cover 14 whereby it most effectively accomplishes its objects of providing cushioning and comfort to a vehicular occupant. Still further, FIG. 4 shows that the miniature imitation 30 in the pocket 44 provides a cognizable bump in the elongate seat belt cover 14 whereby it can be easily located.

Figure 5:
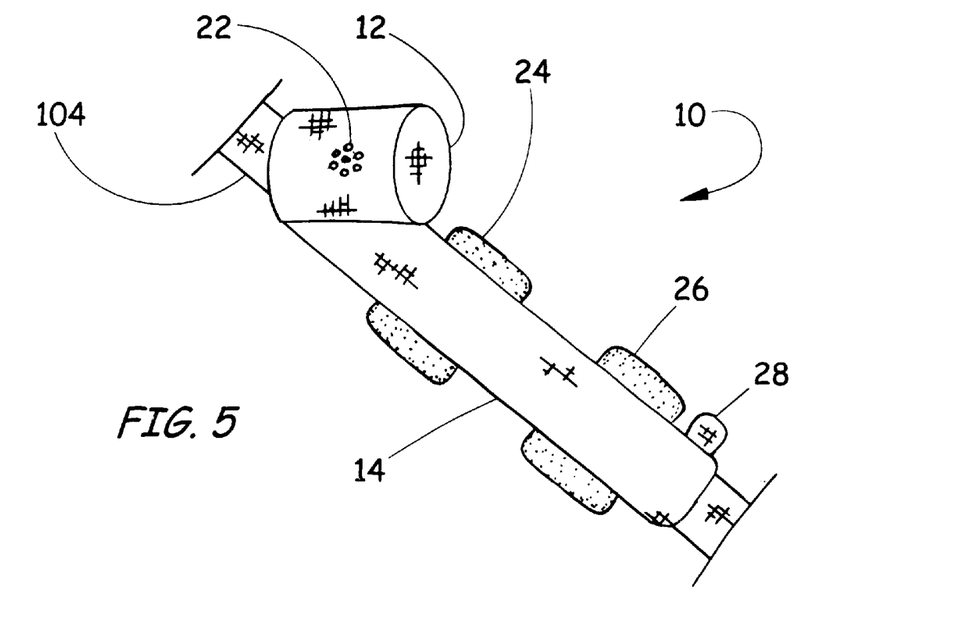
FIG. 5 is a view in front elevation of an alternative embodiment of the combined seat belt cover and pillow again shown coupled to a typical vehicular seat belt.

Turning next to FIG. 5, one sees an alternative embodiment of the combined seat belt cover and pillow 10 again associated with a shoulder belt 104. In this embodiment, however, it is depicted that the invention need not necessarily simulate an animal or other structure. Instead, the combined seat belt cover and pillow 10 incorporates the inventive aspects discussed above without simulating any given structure. The combined seat belt cover and pillow 10 again includes a pillow 12 that again is fixed to an elongate seat belt cover 14. First and second widened portions 24 and 26 again project from the elongate seat belt cover 14 and in this embodiment are explicitly drawn as being constructed from cellular foam. The speaker 22 again is incorporated into the pillow 12 and again can be crafted in any of the ways discussed above. Still further, an area of ultra-smooth material is provided, which in this case comprises a dedicated strip 28 of ultra-smooth material instead of the tongue 18 of the first embodiment.

Figure 6:
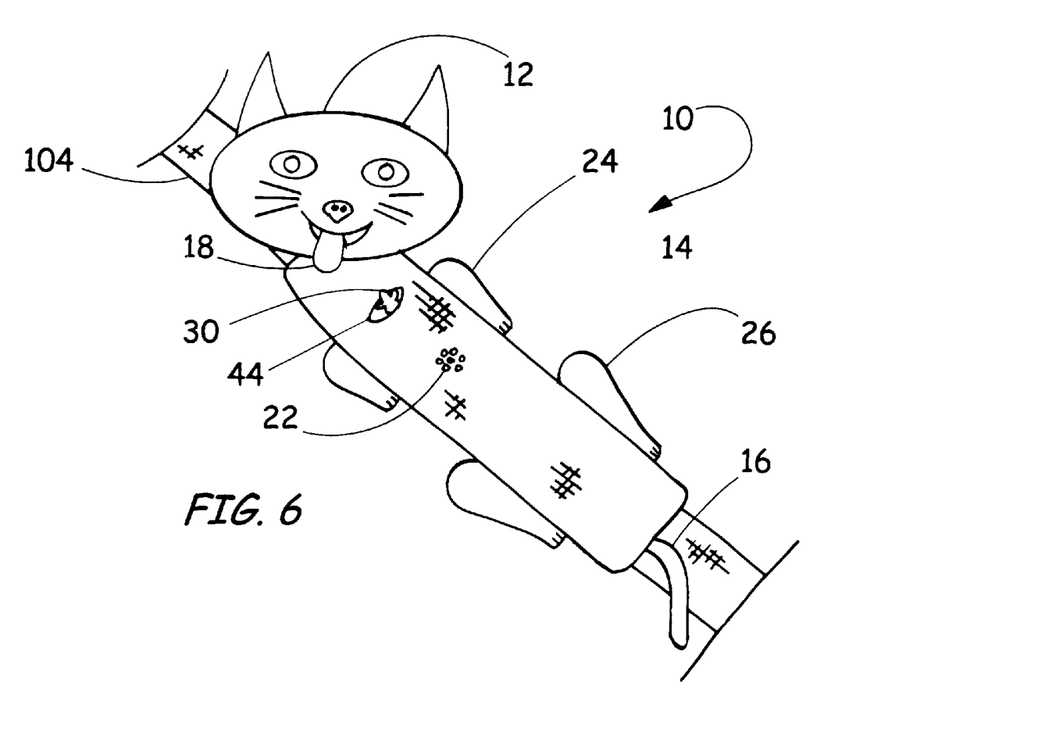
FIG. 6 is a view in front elevation of another alternative embodiment of the combined seat belt cover and pillow also shown coupled to a typical vehicular seat belt.

Next, one may have reference to FIG. 6 where still another embodiment of the invention is shown. There, by simulating a cat, the combined seat belt cover and pillow 10 makes it still more clear that the combined seat belt cover and pillow 10 could simulate any one of a number of structures or animals. Of course, the combined seat belt cover and pillow 10 is again founded on a pillow 12 and an elongate seat belt cover 14. The pillow 12 simulates a cat's head while the elongate seat belt cover 14 simulates a cat's body. The first and second widened portions 24 and 26 simulate a cat's front and rear legs, and the combined seat belt cover and pillow 10 again has a tail 16 coupled to the second end of the elongate seat belt cover 14. A tongue 18 of ultra-smooth material again projects from the pillow 12, and a miniature imitation 30 is slipped into a pocket 44. A speaker 22 with the abovedescribed characteristics is again included but in this case is incorporated into the elongated seat belt cover 14 and not the pillow 12.

Figure 7:
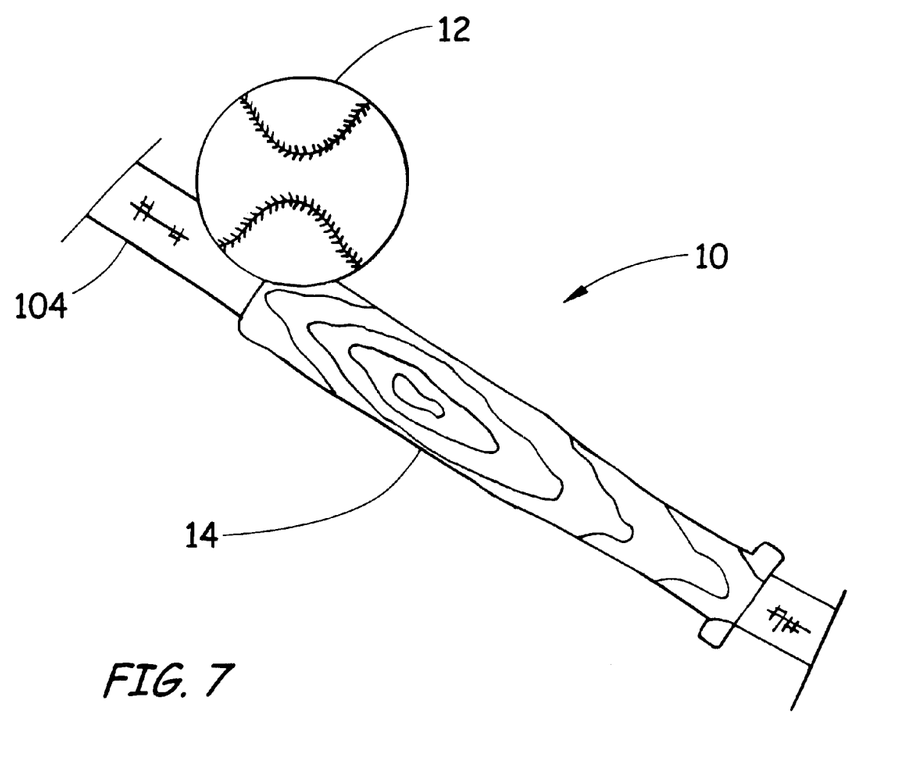
FIG. 7 is a view in front elevation of yet another alternative embodiment of the combined seat belt cover and pillow again shown coupled to a typical vehicular seat belt.

Lastly, FIG. 7 shows yet another embodiment of the invention wherein the combined seat belt cover and pillow 10 demonstrates its ability to simulate an inaminate object. In this case, the combined seat belt cover and pillow 10 simulates a striking implement and game projectile combination. To do so, the pillow 12 simulates a game projectile, which is depicted as a baseball, and the elongate seat belt cover 14 simulates a striking implement, which is depicted as a ball bat. Of course, the pillow 12 could simulate a number of other game projectiles including soccer balls, footballs, basketballs, or hockey pucks. Similarly, the elongate seat belt cover 14 could simulate a variety of other striking implements such as hockey sticks, player's legs, and the like.

It will be clear from the foregoing that the present invention has been shown and described with reference to certain preferred embodiments that merely exemplify the broader invention revealed herein. Certainly those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor. The claims shall be deemed to include equivalent constructions insofar as they do not depart from the spirit and scope of the invention. A plurality of the following claims express certain elements as means for performing a specific function, at times without the recital of structure or material. As the law demands, these claims shall be construed to cover not only the corresponding structure and material expressly described in the specification but also equivalents thereof.

I claim as deserving the protection of United States Letters Patent:

1. A combined seat belt cover and pillow for use relative to a vehicular seat belt arrangement with at least one elongate seat belt to enhance the comfort and safety of a vehicular occupant, the combined seat belt cover and pillow comprising:
   an elongate seat belt cover with a first end, a second end, an elongate body portion, and a means for surrounding at least a portion of the elongate seat belt; and
   a pillow coupled to the elongate seat belt cover adjacent to the first end of the elongate seat belt cover whereby the elongate body portion of the elongate seat belt cover extends away from the pillow in a single direction only toward the second end of the elongate seat belt cover;
   whereby the combined seat belt cover and pillow can be coupled to the elongate seat belt of the vehicular seat belt arrangement with the elongate seat belt cover providing cushioning between the elongate seat belt and the vehicular occupant and dispersing a force of the elongate seat belt against the vehicular occupant and with the pillow providing added lateral cushioning for the head of the vehicular occupant.

2. The combined seat belt cover and pillow of claim 1 wherein the elongate seat belt cover comprises an elongate central panel with elongate first and second panels fixed to opposite sides thereof whereby the central, first, and second panels cooperate to act as the means for surrounding at least a portion of the elongate seat belt.

3. The combined seat belt cover and pillow of claim 2 further comprising a means for selectively securing the first panel to the second panel whereby the elongate seat belt cover can be selectively secured in place surrounding the elongate seat belt.

4. The combined seat belt cover and pillow of claim 1 wherein the elongate seat belt cover is padded.

5. The combined seat belt cover and pillow of claim 1 further comprising a strip of ultra-smooth material affixed to the elongate seat belt cover and pillow.

6. The combined seat belt cover and pillow of claim 1 wherein the elongate seat belt cover and the pillow cooperate to simulate a head and a body of an animal wherein the pillow simulates the head of the animal and the elongate seat belt cover simulates at least a portion of the body of the animal.

7. The combined seat belt cover and pillow of claim 6 further comprising at least a first widened portion fixed to the elongate seat belt cover wherein the first widened portion is generally rigid whereby the first widened portion further disperses the force of the elongate seat belt against the vehicular occupant and wherein the first widened portion simulates at least one set of legs of the simulated animal.

8. The combined seat belt cover and pillow of claim 7 wherein the first widened portion is formed from a panel of generally rigid foam.

9. The combined seat belt cover and pillow of claim 6 further comprising a miniature simulation of an animal wherein the miniature simulation of an animal is smaller than the elongate seat belt cover and pillow and further comprising a means for retaining the miniature simulation of an animal relative to the elongate seat belt cover and pillow.

10. The combined seat belt cover and pillow of claim 9 wherein the miniature simulation of an animal simulates the same animal as the elongate seat belt cover and pillow.

11. The combined seat belt cover and pillow of claim 9 wherein the means for retaining the miniature simulation of the animal relative to the elongate seat belt cover comprises a pocket on the elongate seat belt cover.

12. The combined seat belt cover and pillow of claim 6 further comprising a strip of ultra-smooth material affixed to the elongate seat belt cover and pillow.

13. The combined seat belt cover and pillow of claim 6 further comprising a speaker operably associated with the elongate seat belt cover and pillow and a means for causing the speaker to provide audible communications to a vehicular occupant.

14. The combined seat belt cover and pillow of claim 13 wherein the means for causing the speaker to provide audible communications to a vehicular occupant comprises a means for automatically providing a reminder to a vehicular occupant to fasten his or her seat belt.

15. The combined seat belt cover and pillow of claim 1 wherein the pillow simulates a game projectile.

16. The combined seat belt cover and pillow of claim 15 wherein the elongate seat belt cover and the pillow cooperate to simulate a game projectile and a striking implement wherein the pillow simulates the game projectile and the elongate seat belt cover simulates at least a portion of the striking implement.

17. A combined seat belt cover and pillow for use relative to a vehicular seat belt arrangement with at least one elongate seat belt to enhance the comfort and safety of a vehicular occupant, the combined seat belt cover and pillow comprising:
   an elongate seat belt cover with a first end, a second end, a body portion, and a means for coupling to the elongate seat belt;
   a pillow coupled to the elongate seat belt cover adjacent to the first end of the elongate seat belt cover whereby the combined seat belt cover and pillow can be coupled to the elongate seat belt of the vehicular seat belt arrangement with the elongate seat belt cover providing cushioning between the elongate seat belt and the vehicular occupant and dispersing a force of the elongate seat belt against the vehicular occupant and with the pillow providing added cushioning to the vehicular occupant; and
   at least a first widened portion fixed to the elongate seat belt cover wherein the first widened portion is generally rigid whereby the first widened portion further disperses the force of the elongate seat belt against the vehicular occupant.

18. The combined seat belt cover and pillow of claim 17 wherein the first widened portion is formed from a panel of generally rigid foam.

19. A combined seat belt cover and pillow for use relative to a vehicular seat belt arrangement with at least one elongate seat belt to enhance the comfort and safety of a vehicular occupant, the combined seat belt cover and pillow comprising:

an elongate seat belt cover with a first end, a second end, a body portion, and a means for coupling to the elongate seat belt;

a pillow coupled to the elongate seat belt cover adjacent to the first end of the elongate seat belt cover whereby the combined seat belt cover and pillow can be coupled to the elongate seat belt of the vehicular seat belt arrangement with the elongate seat belt cover providing cushioning between the elongate seat belt and the vehicular occupant and dispersing a force of the elongate seat belt against the vehicular occupant and with the pillow providing added cushioning to the vehicular occupant; and a speaker operably associated with the elongate seat belt cover and pillow and further comprising a means for causing the speaker to provide audible communications to a vehicular occupant.

20. The combined seat belt cover and pillow of claim 19 wherein the means for causing the speaker to provide audible communications to a vehicular occupant comprises a means for automatically providing a reminder to a vehicular occupant to fasten his or her seat belt.

* * * * *